Figure 1:
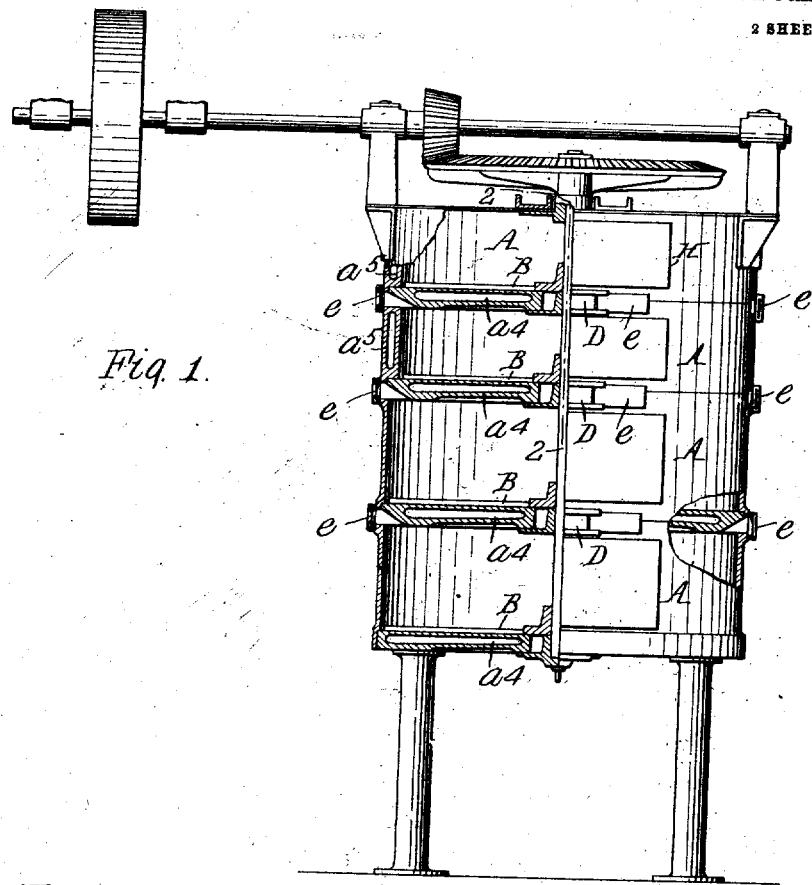

A. W. FRENCH.
STEAM COOKER FOR OIL BEARING MEAL AND THE LIKE.
APPLICATION FILED APR. 23, 1908.

909,778.

Patented Jan. 12, 1909.

2 SHEETS—SHEET 1.

Witnesses:
A. S. Dimond.
E. A. Volk.

Inventor.
A. W. French
By Wilhelm, Parker & Ward
Attorneys.

A. W. FRENCH.
STEAM COOKER FOR OIL BEARING MEAL AND THE LIKE.
APPLICATION FILED APR. 23, 1908.
909,778.
Patented Jan. 12, 1909.
2 SHEETS—SHEET 2.
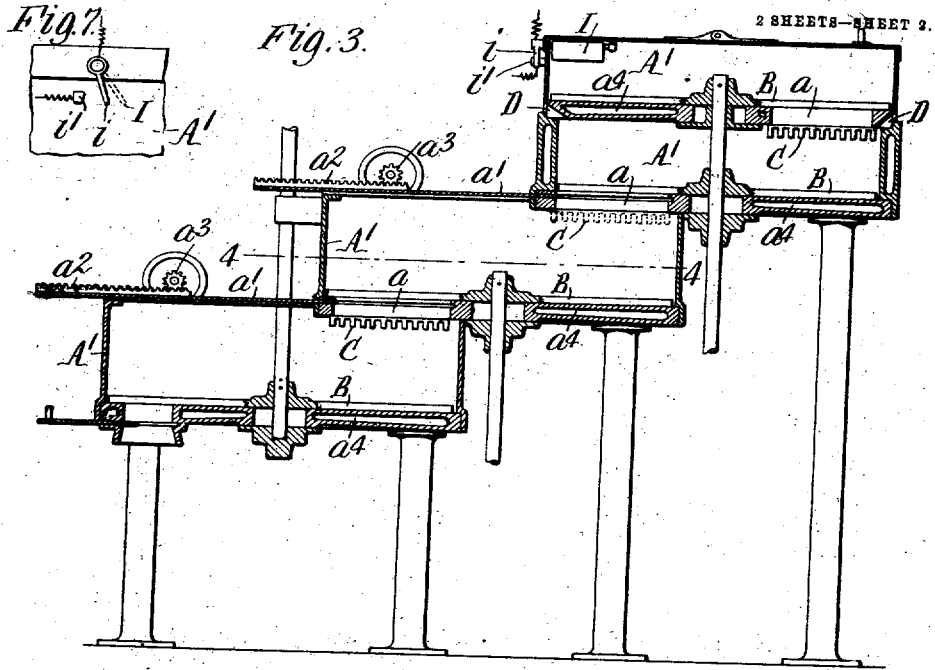
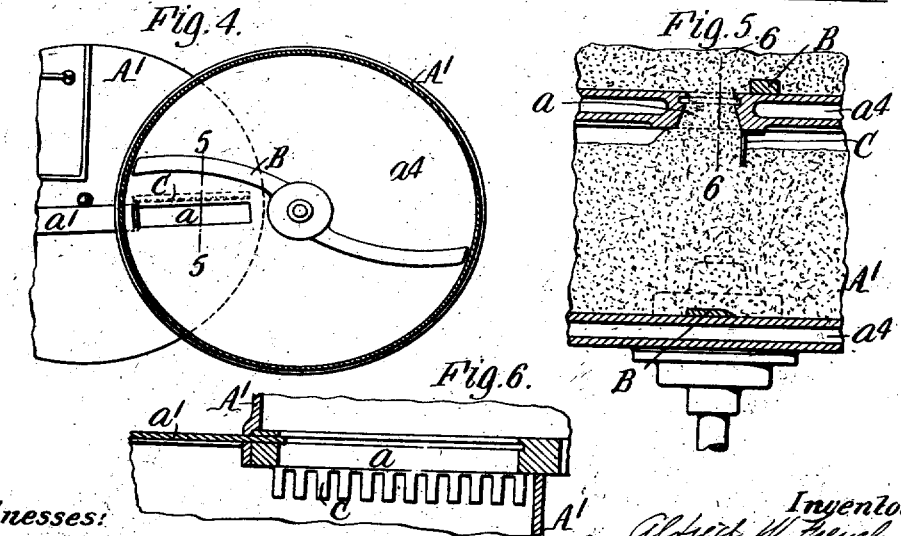
Witnesses:
E. A. Volk.
A. E. Dmond.
Inventor:
Alfred W. French,
by Wilhelm, Parker & Hard,
Attorneys.

UNITED STATES PATENT OFFICE.

ALFRED W. FRENCH, OF PIQUA, OHIO.

STEAM-COOKER FOR OIL-BEARING MEAL AND THE LIKE.

No. 909,778.   Specification of Letters Patent.   Patented Jan. 12, 1909.

Application filed April 23, 1908. Serial No. 428,857.

*To all whom it may concern:*

Be it known that I, ALFRED W. FRENCH, a citizen of the United States, residing at Piqua, in the county of Miami and State of Ohio, have invented a new and useful Improvement in Steam-Cookers for Oil-Bearing Meal and the Like, of which the following is a specification.

This invention relates to steam cookers or kettles of the kind used in oil mills for cooking the oil bearing meal preparatory to expressing the oil therefrom, and more particularly to improvements in continuous automatic cookers of the sort disclosed in U. S. Letters Patent No. 852,058, granted to me April 30, 1907. In the said patented cooker a plurality of superimposed steam kettles are employed provided with bottom discharge openings so arranged that the meal discharges by gravity from each kettle to the one next below, and the delivery of meal to a kettle is controlled by the quantity of meal therein. When meal is withdrawn from the lowest kettle to form a cake for pressing, the level of the meal lowers in this kettle, which allows a corresponding amount of meal to discharge therein from the kettle next above and lower the level of meal in this second kettle, and in a similar manner the discharge of meal from each kettle causes a corresponding quantity of meal to be delivered thereto from the kettle next above. Meal is fed to the top kettle automatically by suitable means, and when all the kettles have once been filled the quantity of meal in each kettle is kept substantially constant by the stated operation of the cooker, and as the meal is delivered into the top and discharged from the bottom of each kettle and is not mixed but descends through the system in layers, a definite period of time, determined by the rate at which the meal is drawn from the bottom kettle, is required for any particular batch of meal to pass through the cooker, so that by drawing the meal from the bottom kettle at regular intervals, all of the meal is uniformly cooked and the services of a skilled meal cook are dispensed with.

One object of the present invention is to provide novel means whereby a similar continuous automatic action of the cooker is obtained without requiring the discharge opening of one kettle to depend into the kettle next below, as they do in the patented kettle.

Other objects of the invention are to produce a steam cooker in which the several kettles can be arranged directly over and upon each other without the usual space required between the kettles for the escape of the moisture driven off from the meal, whereby the construction of the cooker is simplified and it occupies the minimum vertical and floor space; and also to improve steam cookers of this sort in the respects hereinafter described and set forth in the claims.

Figure 2:
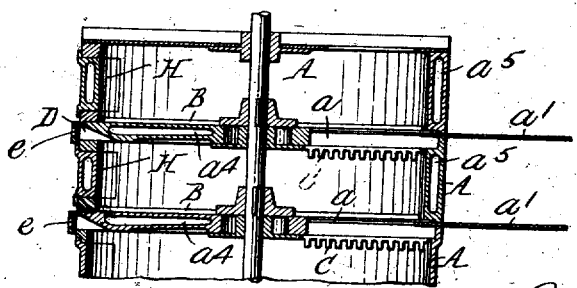

In the accompanying drawings, consisting of two sheets: Figure 1 is a sectional elevation of a continuous steam cooker embodying the invention. Fig. 2 is a fragmentary sectional elevation thereof, in line 2—2, Fig. 1. Fig. 3 is a sectional elevation of a cooker of modified construction. Fig. 4 is a fragmentary sectional plan view thereof, in line 4—4, Fig. 3. Fig. 5 is a fragmentary transverse sectional elevation thereof, on an enlarged scale, in line 5—5, Fig. 4, showing the manner in which the meal in one kettle controls the delivery of meal thereto from the kettle next above. Fig. 6 is a fragmentary longitudinal sectional elevation thereof, in line 6—6, Fig. 5. Fig. 7 is a detail of the alarm device used in the first kettle.

Like letters of reference refer to like parts in the several figures.

The steam cooking kettles or vessels are arranged one above the other, so that the meal can flow by gravity through a discharge opening $a$ in the bottom of one kettle into the next kettle below. In the preferred construction, shown in Figs. 1 and 2, the kettles A are arranged one directly over and upon the other, with the bottom of one kettle forming the top of the one next below, but this arrangement is not essential to the automatic discharging action of the kettles and they can be differently arranged, for instance, as shown in Figs. 3 and 4, the kettles A' are arranged in a stepped series with that portion of the bottom of one kettle containing the discharge opening overlapping the kettle next below. The discharge opening of each kettle, except the bottom one, preferably extends nearly from the edge to the center of the kettle so that the meal will discharge from the central as well as the outer portion of the kettle. Horizontally sliding gates $a'$ are provided for the discharge openings, the gates extending out through the sides of the kettles. In the construction shown in Figs. 3 and 4, the gates are preferably operated by toothed racks $a^2$ and pinions $a^3$.

Any suitable number of the kettles may be employed. Four are shown in each of the cookers illustrated.

Each kettle has a hollow bottom $a^4$ forming a steam chamber which is supplied with steam by usual means (not shown) for cooking or heating the meal, and the two upper kettles are preferably shallower than the others and, in the cooker shown in Figs. 1 and 2, are provided with hollow or jacketed side walls $a^5$ also supplied with steam.

Each kettle is provided with the usual rotary stirrer or scraper B consisting of arms projecting horizontally in the bottom of the kettle from a central vertical shaft. The stirrers scrape the bottoms of the kettles, so as to keep the lower portion of the meal in motion and prevent it from being scorched, and move it to the discharge openings.

C represents baffles or dams which depend a short distance into one kettle from the bottom of the kettle next above, at one side of the discharge opening of the latter. The dam or baffle may be of various constructions. As shown, it consists of spaced depending fingers secured in place in any suitable manner, and it is located at one side or the other of the discharge opening, depending upon the direction of rotation of the stirrer in the kettle into which it depends, for the dam should be at that side of the opening which is last passed by the stirrers. The stirrers, in rotating through or under the masses of meal in the kettles, produce wave-like formations or ridges of meal which project above the general level of the meal in the several kettles and follow the stirrer arms, and these waves or ridges, encountering the dams, cause the meal in one kettle to pile up against the dam so as to choke or close the discharge opening in the kettle next above, as indicated in Fig. 5, and prevent the discharge of meal through said opening. The stirrers also cause a sluggish rotary movement of the meal in the kettles so that the dams, in effect, rake or drag over the upper surface of the meal, which assists in piling the meal up in the discharge openings. In this manner, when the meal rises in one kettle to a level slightly above the lower edge of the dam therein, it will stop the delivery of meal thereto from the next kettle above until a quantity of meal is drawn from the bottom kettle, which acts to lower the level therein and permit a corresponding quantity of meal to discharge thereinto from the next higher kettle, the discharge from which allows a corresponding discharge from the next kettle and so on through the series. Thus the bottom of one kettle can rest directly upon the top of the kettle below it and the feed of the meal from the upper kettle to the lower one controlled so as to maintain a predetermined desired constant quantity of meal in each kettle and always leave an air space between the meal in one kettle and the bottom of the next kettle above.

In the cooker shown in Figs. 1 and 2, vent holes D are provided in the upper portion of each kettle or compartment for the escape of the moisture rising from the meal, the holes being conveniently formed by recesses in the edges of the kettle bottoms. Gates or valves $e$ of any suitable sort may be provided for the vent holes D. These holes are sufficiently large and numerous to allow the escape of moisture when the meal is relatively dry, but if the meal is moist, additional means (not shown) are required to take care of the moisture.

A large covered man-hole H is provided in the side of each kettle to afford access thereto.

In the operation of the cooker the meal passes in succession through the kettles, the time required for the passage of every portion of the meal being substantially the same. The meal is subjected both at the bottom and sides to the steam heat in the two upper kettles, and the bottom of the top kettle also heats the top portion of the meal in the second kettle so that the meal is quickly raised to the necessary cooking temperature in these two kettles. The steam pressure on the lower kettles is much less than on the upper ones, it being only necessary to retain the meal at the temperature given it in the two upper kettles and allow it to cook by its own heat. As the lower kettles are of larger capacity than the upper ones, it requires longer for each portion of meal to pass through these kettles, and the meal is therefore cooked slowly in these kettles at a moderate heat for a longer time than it can be kept in the greater heat of the upper kettles, which results in thoroughly softening the oil cells of the meal so that they will more readily give up their oil under pressure, without either driving off the necessary moisture or scorching or discoloring the meal. The long slow cooking of the meal also coagulates the albumen in the meal so that the meal will not creep in the press and burst the press cloths, as it does when cooked more rapidly.

The described cooker therefore, besides being automatic in its action and dispensing with the services of a skilled meal cook, also improves the meal, which results in an increased yield of oil and a higher grade of both the oil and the cake.

In the construction shown in Figs. 3 and 4, the top kettle sets directly over and on the second one and these two upper kettles are shallower than the rest, so that the action of the cooker is substantially like that of the other cooker shown in Figs. 1 and 2.

Meal is fed to the top kettle by suitable means, and a device is preferably employed to give warning whenever the meal falls below a predetermined level therein, so that more meal can be supplied to maintain the required quantity of meal in the kettle. The device shown for this purpose, in Figs. 3 and 7, consists of a plate I hinged in the upper portion of the kettle so as to ride on the surface of the meal and be deflected or held in an inclined position by the motion of the meal in the kettle. A contact arm $i$ connected to the plate is adapted to engage a contact $i'$, Fig. 7, and close an electric circuit including an alarm, when the meal lowers sufficiently in the kettle to allow the plate to assume a vertical position to thereby sound the alarm. Any other suitable signal device controlled by the motion of the meal in the kettle and serving to indicate the level of the meal could be used.

I claim as my invention:

1. The combination of a plurality of heating kettles or chambers for solid material arranged in a descending series and each kettle except the last having a bottom discharge opening arranged to discharge into a lower kettle, and means in each kettle except the first which cause the material in said kettle to pile up under the discharge opening of the next higher kettle above the general level of said material and stop the discharge of the material from said last mentioned kettle to regulate the quantity of material in the kettles, substantially as set forth.

2. The combination of a plurality of heating kettles or chambers for solid material arranged in a descending series and each kettle except the last having a bottom discharge opening arranged to discharge the material into a lower kettle, traveling stirrers in said kettles, and a dam which depends into the upper portion of each kettle except the first below the discharge opening in the kettle next above and against which dam said stirrer causes the material in said kettle in which the dam is located to pile up under said discharge opening and stop the discharge of material therefrom to regulate the quantity of material in the kettles, substantially as set forth.

3. The combination of a plurality of heating kettles or chambers for solid material arranged one over and closing the other, matically to regulate the discharge of material in said kettles and preventing the material from rising in one kettle to the bottom of the kettle next above, and vent holes in the upper portions of said kettles for the escape of moisture, substantially as set forth.

4. The combination of a plurality of heating kettles or chambers for solid material arranged one directly on top of and covering the other, means which operate automatically to regulate the discharge of material from one kettle to the kettle next below to govern the quantity of material in the several kettles except the first, said kettles having covered man holes in the sides thereof which afford access to said kettles, substantially as set forth.

5. The combination of a heating kettle for solid material, means which cause a horizontal motion of the material in the kettle, and a movable indicating device which rides on the surface of the material and is held inactive by the motion of the material in the kettle and operates a signal when the material falls below a predetermined level in the kettle, substantially as set forth.

Witness my hand, this 21st day of April, 1908.

ALFRED W. FRENCH.

Witnesses:
C. W. PARKER,
C. B. HORNBECK.

---

It is hereby certified that in Letters Patent No. 909,778, granted January 12, 1909, upon the application of Alfred W. French, of Piqua, Ohio, for an improvement in "Steam-Cookers for Oil-Bearing Meal and the Like," errors appear in the printed specification requiring correction, as follows: In lines 56–57, page 3, the words "matically to regulate the discharge of material in said kettles" should be stricken out and the following inserted instead: *means for regulating the quantity of material in said kettles;* and that the said Letters Patent should be read with these corrections therein that the same may conform to the record of the case in the Patent Office.

Signed and sealed this 9th day of February, A. D., 1909.

[SEAL.]

C. C. BILLINGS,
*Acting Commissioner of Patents.*

Meal is fed to the top kettle by suitable means, and a device is preferably employed to give warning whenever the meal falls below a predetermined level therein, so that more meal can be supplied to maintain the required quantity of meal in the kettle. The device shown for this purpose, in Figs. 3 and 7, consists of a plate I hinged in the upper portion of the kettle so as to ride on the surface of the meal and be deflected or held in an inclined position by the motion of the meal in the kettle. A contact arm $i$ connected to the plate is adapted to engage a contact $i'$, Fig. 7, and close an electric circuit including an alarm, when the meal lowers sufficiently in the kettle to allow the plate to assume a vertical position to thereby sound the alarm. Any other suitable signal device controlled by the motion of the meal in the kettle and serving to indicate the level of the meal could be used.

I claim as my invention:

1. The combination of a plurality of heating kettles or chambers for solid material arranged in a descending series and each kettle except the last having a bottom discharge opening arranged to discharge into a lower kettle, and means in each kettle except the first which cause the material in said kettle to pile up under the discharge opening of the next higher kettle above the general level of said material and stop the discharge of the material from said last mentioned kettle to regulate the quantity of material in the kettles, substantially as set forth.

2. The combination of a plurality of heating kettles or chambers for solid material arranged in a descending series and each kettle except the last having a bottom discharge opening arranged to discharge the material into a lower kettle, traveling stirrers in said kettles, and a dam which depends into the upper portion of each kettle except the first below the discharge opening in the kettle next above and against which dam said stirrer causes the material in said kettle in which the dam is located to pile up under said discharge opening and stop the discharge of material therefrom to regulate the quantity of material in the kettles, substantially as set forth.

3. The combination of a plurality of heating kettles or chambers for solid material arranged one over and closing the other, matically to regulate the discharge of material in said kettles and preventing the material from rising in one kettle to the bottom of the kettle next above, and vent holes in the upper portions of said kettles for the escape of moisture, substantially as set forth.

4. The combination of a plurality of heating kettles or chambers for solid material arranged one directly on top of and covering the other, means which operate automatically to regulate the discharge of material from one kettle to the kettle next below to govern the quantity of material in the several kettles except the first, said kettles having covered man holes in the sides thereof which afford access to said kettles, substantially as set forth.

5. The combination of a heating kettle for solid material, means which cause a horizontal motion of the material in the kettle, and a movable indicating device which rides on the surface of the material and is held inactive by the motion of the material in the kettle and operates a signal when the material falls below a predetermined level in the kettle, substantially as set forth.

Witness my hand, this 21st day of April, 1908.

ALFRED W. FRENCH.

Witnesses:
C. W. PARKER,
C. B. HORNBECK.

---

It is hereby certified that in Letters Patent No. 909,778, granted January 12, 1909, upon the application of Alfred W. French, of Piqua, Ohio, for an improvement in "Steam-Cookers for Oil-Bearing Meal and the Like," errors appear in the printed specification requiring correction, as follows: In lines 56-57, page 3, the words "matically to regulate the discharge of material in said kettles" should be stricken out and the following inserted instead: *means for regulating the quantity of material in said kettles;* and that the said Letters Patent should be read with these corrections therein that the same may conform to the record of the case in the Patent Office.

Signed and sealed this 9th day of February, A. D., 1909.

[SEAL.]

C. C. BILLINGS,
*Acting Commissioner of Patents.*

It is hereby certified that in Letters Patent No. 909,778, granted January 12, 1909, upon the application of Alfred W. French, of Piqua, Ohio, for an improvement in "Steam-Cookers for Oil-Bearing Meal and the Like," errors appear in the printed specification requiring correction, as follows: In lines 56–57, page 3, the words "matically to regulate the discharge of material in said kettles" should be stricken out and the following inserted instead: *means for regulating the quantity of material in said kettles;* and that the said Letters Patent should be read with these corrections therein that the same may conform to the record of the case in the Patent Office.

Signed and sealed this 9th day of February, A. D., 1909.

[SEAL.]

C. C. BILLINGS,
*Acting Commissioner of Patents.*